3,514,517
INTRAVAGINAL CONTRACEPTIVE COMPO-
SITIONS EMPLOYING TERPENYLPHENYL
POLYOXYETHYLENE ETHERS
Kazumaro Furuse, Tokyo, and Etsuro Fujiwara, Osaka,
Japan, assignors to Eisai Kabushiki-Kaisha, Tokyo,
Japan, a corporation of Japan
No Drawing. Filed Aug. 13, 1965, Ser. No. 479,616
Claims priority, application Japan, Sept. 19, 1964,
39/53,291
Int. Cl. A61k 27/00
U.S. Cl. 424—341                                6 Claims

ABSTRACT OF THE DISCLOSURE

This invention relates to intravaginal contraceptive compositions consisting of new terpenylphenyl polyoxyethylene ethers as the active spermicidal agent therein.

The contraceptive compositions of the present invention may be provided in various forms such as in the form of a suppository, a cream, an aqueous gel, a tablet and an aerosol foam. The compositions are characterized by their low toxicity, non-injurious effect on Döderlein bacillus, low hemolytic action on the red cell, excellent emulsifying power, high wettability as well as their high spermicidal activity.

---

This invention pertains to novel intravaginal contraceptive compositions and more particularly to an intravaginal contraceptive composition containing new nonionic surfactants possessing spermicidal action.

The novel intravaginal contraceptive composition of the present invention consist of new terpenylphenol derivatives as an active ingredient and other conventional auxiliary additive components.

We have found that the new nonionic surfactant having the formula:

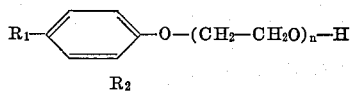

shows an excellent spermicidal action without injurious effect on Döderlein bacillus in the vagina and less toxicity as compared with those of the known alkylphenoxyethanol derivatives, such as nonylphenyl polyoxyethylene ether which has been employed as the active ingredient in contraceptive preparations. In the above formula, $R_1$ stands for a radical selected from the group consisting of p-menthan-1-yl, p-menthan-4-yl and 1-p-menthene-8-yl, $R_2$ for hydrogen atom or a radical the same as that given for $R_1$ and $n$ is a whole number of from 4 to 20.

Owing to their remarkable wetting and foaming properties, the specified compounds when used as the contraceptive compositions overspread around the interior surfaces of the vagina and cover completely the opening of the uterus to form a barrier therein.

In the embodiment of the contraceptive compositions of the present invention, there may be employed as the active agent 4-(1'-p-menthan-8-yl)-phenyl polyoxyethylene ether and the like, in particular 4-(1'-p-methyl)-phenyl-polyoxyethylene ether, the compound (A); 4-(4'-p-menthyl)-phenylpolyoxyethylene ether, the compound (B); 2,4-di-(1'-p-menthyl)-phenylpolyoxyethylene-ether, the compound (C); and 2,4-di(4'-p-menthyl)-phenyl-polyoxyethylene-ether, the compound (D); the compounds being represented respectively by the following formulae:

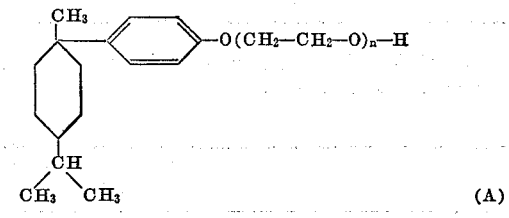
(A)

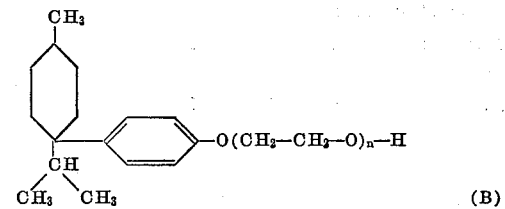
(B)

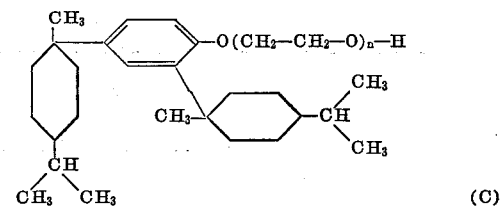
(C)

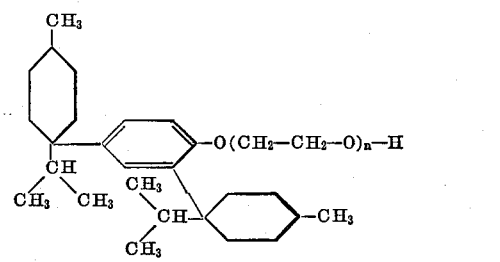
(D)

wherein $n$ is an integer of 7–11, in a single form or in an admixture of the compounds (A) and (B); (C) and (D); and (A), (B), (C) and (D), which can be prepared by an addition reaction of terpenylphenol and excess moles of ethylene oxide.

For the preparation of contraceptive composition, these compounds may be employed respectively in a concentration of from 0.1 percent to 30 percent by weight. The compositions thus obtained neither irritate the vaginal membrane nor injuriously effect Döderlein bacillus, even at a considerably high concentration such as 50 mg./ml. or more of the active compound. The compositions may be provided in a form of suppository, cream, aqueous gel, tablet and aerosol preparation in combination with a gaseous propellant. The lower toxicity of the particular active ingredient of the present invention in comparison with that of the known nonylphenyl polyoxyethylene ether, for example, as follows:

Each of 0.5 ml. of a 1% suspension in aqueous isotonic saline solution of red blood corpuscle from rabbit was mixed in a test tube respetively with 0.5 ml. of a solution each containing 0.1%, 0.01% and 0.001% of the active compounds dissolved in aqueous isotonic saline solution. The time of duration by minute required for complete dissolution of the red blood corpuscle in the respective test tube was observed. The resulting data are given as follows:

| Samples | Time by minute required for complete dissolution of red blood corpuscle of rabbit in the solutions at concentrations of— | | |
|---|---|---|---|
| | 0.1% | 0.01% | 0.001% |
| Mixture of compounds (A) and (B) (n=8.1) | 0 | 7-8 | >2,400 |
| Mixture of compounds (A), (B), (C) and (D) (n=8.8) | 0 | 10 | >2,400 |
| Nonylphenyl polyoxyethylene ether (n=10) (control) | 0 | 0 | >2,400 |

Lethal dose $LD_{50}$ determined with mice of the active compounds was as follows:

| Samples | Oral administration (g./kg.) | Intraperitoneal injection (mg./kg.) |
|---|---|---|
| Mixture of compounds (A) and (B) (n=8.1) | >5.5 | 267 |
| Mixture of compounds (A), (B), (C) and (D) (n=8.8) | >8.0 | 167 |
| Nonylphenyl polyoxyethylene ether (n=10) (control) | 2.5 | 100 |

The physical properties such as, dispersing, foaming and wetting properties of the new active compounds are listed:

| Physical properties | Mixture of compounds (A) and (B) (n=8.1) | Mixture of compounds (A), (B), (C) and (D) (n=8.8) |
|---|---|---|
| HLB [1] (by Griffin method) | 12.1 | 12.0 |
| pH | 6.2 | 6.62 |
| Surface tension (dyne/cm./25° C.) | 33.1 | 34.6 |
| Height of foam (mm.) (by Rose Miles method) | 165 | 140 |
| Wetting properties by seconds measured by felt-sedimentation method | 6 | 8 |
| Specific gravity | 1.081 | 1.078 |
| Cloud point (° C.) at 1% aqueous solution | 58 | 65 |

[1] Hydrophile-Lipophile-Balance.

The spermicidal activity on spermatozoa in semen reppresented by the new active compounds of the present invention have been determined as follows:

Equal amounts man's semen and of a dilute solution of the active compound which contains respectively at concentrations of 0.25%, 0.125% and 0.63% in an isotonic saline solution were taken by means of a definite capillary pipette on a concave glass plate and were throughly mixed. A drop of the mixture was placed on a glass plate and was immediately viewed by using a microscope of 200 times magnitude to investigate how many minutes it takes to cease the migration of all of the spermatozoa counted in a definite area. The results thus obtained are given as follows:

| Samples | Concentrations of compounds (min.) | | |
|---|---|---|---|
| | 0.25% | 0.125% | 0.063% |
| Mixture of compounds (A) and (B) | 0 | 0 | 15-20 |
| Mixture of compounds (A), (B), (C) and (D) | 0 | 0 | <5 |

The active compounds to be used in the contraceptive composition according to the present invention may be synthetically prepared by additional-reaction of 4-30 moles of ethylene oxide and one mole of terpenylphenol.

Following examples will serve to illustrate the embodiment of the invention.

EXAMPLE 1

Preparation of suppository composition having the formulation

| | G. |
|---|---|
| A mixture of the aforementioned compounds (A) and (B) (n=8.1) | 5.1 |
| Polyethylene glycol having an average molecular weight of 1,500 | 55.0 |
| Polyethylene glycol having an average molecular weight of 4,000 | 40.0 |

5.0 grams of a mixture of the aforementioned formulae (A) and (B) (n=8.1), 55.0 grams of polyethylene glycol having an average molecular weight of 1,500 and 40.0 grams of polyethylene glycol having an average molecular weight of 4,000 were taken into a dried vessel and the whole was fused by warming at 50°–60° C. on a water bath. The molten mass was poured into a mold for suppository; the internal walls of the mold having been previously coated with liquid petrolatum as mold-releasing agent, and the mold was then cooled with tap water.

There was thus obtained suppositories having each about 1.5 grams when recovered from the mold.

EXAMPLE 2

Preparation of a liquid composition having the formulation

| | G. |
|---|---|
| A mixture of the compounds (A) and (B) (n=8.1) | 5.0 |
| Propylene glycol | 15.0 |
| Carboxypolymethylene | 1.0 |
| Methyl paraben | 0.15 |
| Propyl paraben | 0.05 |
| Aminomethylpropanediol | 0.05 |
| Distilled water sufficient to make up the total to | 100.00 |

To about 70 ml. of distilled water warmed to about 80° C. were added 5.0 grams of a mixture of the compounds having the Formulae A and B. To the solution thus obtained 15.0 grams of propylene glycol, 0.15 gram of methyl paraben and 0.05 gram of propyl paraben were successively added. The solution was cooled to room temperature and 1.0 gram of carboxymethylene was introduced while stirring thoroughly. A 1.0% aqueous solution of aminomethylpropandiol was then slowly added to the solution and the total volume of the solution was made up to 100 grams with addition of a sufficient amount of distilled water.

The fluidity of resulting solution may be controlled at will by employing a varied amount of the carboxymethylene in the above composition.

EXAMPLE 3

Preparation of a viscous solution having the formulation

| | G. |
|---|---|
| A mixture of the compounds (A) and (B) (n=8.1) | 10.0 |
| Glyceryl monostearate | 2.0 |
| Glyceryl monostearate (self-emulsifying type) | 2.0 |
| Myristic acid | 2.0 |
| Stearic acid | 3.0 |
| Polyvinyl pyrolidone | 1.5 |
| Triethanolamine | 2.0 |
| Methyl paraben | 0.2 |
| Propyl paraben | 0.1 |
| Distilled water sufficient to make up the total to | 100.0 |

2.0 grams of glyceryl monostearate, 2.0 grams of glyceryl monostearate (self-emulsifying type), 0.2 gram of propyl paraben and 10.0 grams of a mixture of the compounds having Formulae A and B, (n=8.1), were weighed into a dried vessel and the whole was fused on a water bath. Mark I was given to the melt.

2.0 grams of myristic acid and 3.0 grams of stearic acid were weighed into another dry vessel and the whole was heated to melt on a water bath. Mark II was given to the melt.

70 ml. of distilled water was measured into another vessel and heated to boil. 1.5 grams of polyvinyl pyrrolidone and 2.0 grams of triethanolamine were added to dissolve thereinto. The solution was immediately added to the melt II at the temperature of 80°–85° C. and the melt I was then added thereto. The mixture thus obtained was cooled with tap water to room temperature, and the whole was finally made up to 100 grams by adding an additional distilled water.

The solution and 10 grams of an aerosol propellant mixture consisting of dichlorofluoromethane and dichlorotetrafluoroethane at a ratio of 1:6 were charged into a pressure vessel having a 150 ml. capacity and provided with a releasing valve.

EXAMPLE 4

Preparation of a mixture having the formulation

|  | G. |
|---|---|
| A mixture of (A) and (B) ($n=8.1$) | 10.0 |
| Dioctyl sodium sulfosuccinate | 2.0 |
| Sodium bicarbonate | 20.0 |
| Tartaric acid | 20.0 |
| Mannitol | 20.0 |
| Soluble starch | 26.0 |
| Talcum | 2.0 |
|  | 100.0 |

20 grams of tartaric acid, 20 grams of mannitol and 26 grams of soluble starch were weighed into a mixer and the whole was thoroughly mixed.

The mixture thus obtained was thoroughly mixed with 10.0 grams of a mixture of the compounds (A) and (B) ($n=8.1$), and 2 grams of dioctyl sodium sulfosuccinate in about 10 ml. of methanol to obtain a homogeneous wet mass, sieved through a 50 mesh sieve, dried and blended with 20 grams of sodium bicarbonate and 2 grams of talcum.

From the blend, fragile tablets each of which having 500 mg. were prepared as usual by means of a conventional tablet making machine.

EXAMPLE 5

Suppository, aqueous gel, aerosol preparation and easily fragile tablet which had been obtained by aforementioned examples were respectively diluted with an isotonic saline solution to give the volumes of 5, 10, 20, 40, 50 and 80 times dilutions. Each of the solutions was mixed thoroughly with an equal amount of man's spermatozoa on a concaved glass plate and well mixed.

A drop of each of the diluted mixtures on a glass plate was immediately viewed through a 300 times magnified microscope and the time by minute required for becoming motionless of all of the spermatozoa within the sight of the area was recorded. The results were as follows:

|  | Dilutions by multiples |  |  |  |  |  |
|---|---|---|---|---|---|---|
|  | 5 | 10 | 20 | 30 | 40 | 50 | 80 |
| Example 1 (suppository) | 0 | 0 | 0 | 0 | 0 | [1]<5 | |
| Example 2 (aqueous gel) | 0 | 0 | 0 | 0 | 0 | 0 | 10 |
| Example 3 (aerosol) | 0 | 0 | 0 | 0 | 0 |  | [1]2–3 |
| Example 4 (fragile tablet) | 0 | 0 | 0 | 0 | 0 | [1]<5 | |

[1] Minutes.

The spermicidal activity of the contraceptive compositions illustrated by the above examples which contain the particular compounds corresponding to the aforementioned Formula I may be strengthened by adding a compound or compounds such as an unsaturated fatty acid, for example, ricinoleic acid; thymol and cresol which are insoluble or sparingly soluble in water and possess dispersing and solubility-promoting properties and also a spermicidal activity.

What is claimed is:

1. An intravaginal contraceptive composition which comprises terpenylphenyl polyoxyethylene ether of the formula:

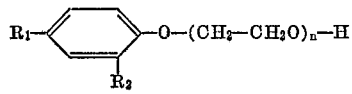

wherein $R_1$ stands for a substituent selected from the group consisting of p-menthan-1-yl, p-menthan-4-yl and 1-p-menthen-8-yl; $R_2$ for H or a substituent selected from the group consisting of p-menthan-1-yl, p-menthan-4-yl and 1-p-menthene-8-yl; and $n$ is a whole number of from 4 to 20, as a spermicidally active agent and conventional auxiliary additives.

2. An intravaginal contraceptive composition as claimed in claim 1 in which a mixture of the compounds selected from the group consisting of 4-(1'-p-menthyl)-phenyl polyoxyethylene ether, 4-(4'-p-menthyl)-phenyl-polyoxyethylene ether, 2,4-di-(1'-p-menthyl)-phenyl-polyoxyethylene ether and 2,4-di-(4'-p-menthyl)-phenyl-polyoxyethylene ether is used as the active ingredient.

3. A contraceptive composition as claimed in claim 1 in which 4-(1'-p-menthyl)-phenyl-polyoxyethyleneethanol is used as the active ingredient.

4. A contraceptive composition as claimed in claim 1 in which 4-(4'-p-menthyl)-phenyl-polyoxyethyleneethanol is used as the active ingredient.

5. A contraceptive composition as claimed in claim 1 in which 2,4-di-(1'-p-menthyl)-phenyl-polyoxyethyleneethanol is used as the active ingredient.

6. A contraceptive composition as claimed in claim 1 in which 2,4-di-(4'-p-menthyl)-phenyl-polyoxyethyleneethanol is used as the active ingredient.

References Cited

UNITED STATES PATENTS

| 2,467,884 | 4/1949 | Elias | 167—58 |
| 2,541,103 | 2/1951 | Sander | 167—58 |
| 2,752,284 | 6/1956 | Berliner et al. | 167—58 |
| 2,889,250 | 6/1959 | Menoe et al. | 167—58 |
| 3,244,589 | 4/1966 | Sunnen et al. | 167—58 |

ALBERT T. MEYERS, Primary Examiner

S. J. FRIEDMAN, Assistant Examiner

U.S. Cl. X.R.

260—613